(12) United States Patent
Hung et al.

(10) Patent No.: US 12,484,834 B2
(45) Date of Patent: Dec. 2, 2025

(54) KETOGENIC DIETARY EVALUATION SYSTEM AND OPERATION METHOD THEREOF

(71) Applicants: Kaohsiung Chang Gung Memorial Hospital, Kaohsiung (TW); Taipei Medical University (TMU), Taipei (TW)

(72) Inventors: Pi-Lien Hung, Kaohsiung (TW); Syu-Jyun Peng, Zhubei (TW)

(73) Assignees: Kaohsiung Chang Gung Memorial Hospital, Kaohsiung (TW); Taipei Medical University (TMU), Taipei (TW)

( * ) Notice: Subject to any disclaimer, the term of this patent is extended or adjusted under 35 U.S.C. 154(b) by 527 days.

(21) Appl. No.: 17/979,162

(22) Filed: Nov. 2, 2022

(65) Prior Publication Data

US 2023/0134678 A1 May 4, 2023

(30) Foreign Application Priority Data

Nov. 2, 2021 (TW) ................ 110140849

(51) Int. Cl.
*A61B 5/369* (2021.01)
*A61B 5/00* (2006.01)

(52) U.S. Cl.
CPC ............ *A61B 5/369* (2021.01); *A61B 5/4094* (2013.01); *A61B 5/7203* (2013.01)

(58) Field of Classification Search
CPC ..... A61B 5/369; A61B 5/4094; A61B 5/7203; A61B 5/372; A61B 5/4848; A61B 5/4833; A61B 5/7267
See application file for complete search history.

(56) References Cited

U.S. PATENT DOCUMENTS 4,146,454 A * 3/1979 Haber .................... B01J 19/087
436/66
7,440,806 B1 * 10/2008 Whitehurst ....... A61M 5/14276
607/45
(Continued)

FOREIGN PATENT DOCUMENTS

CA 3173641 A1 * 9/2021 ............. A23L 33/10
CN 101821741 A 9/2010
(Continued)

OTHER PUBLICATIONS

Su, Ting-Yu, et al., "Graph Theory-Based Electroencephalographic Connectivity and Its Association with Ketogenic Diet Effectiveness in Epileptic Children", Nutrients, Jun. 25, 2021, 13, 2186, 15 pages.

*Primary Examiner* — Jeffrey G. Hoekstra

(57) ABSTRACT

An operating method of a ketogenic dietary evaluation system includes steps as follows. The electroencephalogram data of a responder group and the electroencephalogram data of a non-responder group are preloaded, in which each electroencephalogram datum includes electroencephalograms of channels. The electroencephalograms of the channels are preprocessed to obtain the preprocessed electroencephalograms of the channels. A connectivity matrix is obtained on a basis of the phase synchronization between each two of the preprocessed electroencephalograms of the channels. The connectivity matrix is sampled and analyzed through different frequency bands and different proportion threshold values to obtain graphical parameters. A predictive model is established on a basis of a reduction rate of a predetermined event of the responder group, a reduction rate of the predetermined event of the non-responder group and the parameters.

8 Claims, 2 Drawing Sheets

(56) References Cited

U.S. PATENT DOCUMENTS

| | | | |
|---|---|---|---|
| 11,158,423 B2* | 10/2021 | Jain | G16H 10/60 |
| 2008/0221932 A1* | 9/2008 | Kane | G16H 20/60 |
| | | | 705/3 |
| 2011/0065656 A1 | 3/2011 | Martin et al. | |
| 2015/0344413 A1* | 12/2015 | Araujo | A61P 25/08 |
| | | | 514/424 |
| 2020/0159750 A1* | 5/2020 | Shadrokh | G06V 10/25 |
| 2020/0219605 A1* | 7/2020 | Govindjee | G16H 20/60 |
| 2021/0030323 A1* | 2/2021 | Hayter | A61B 5/14532 |
| 2021/0365687 A1* | 11/2021 | Starson | G06V 30/412 |
| 2023/0134678 A1* | 5/2023 | Hung | A61B 5/4094 |
| | | | 600/544 |
| 2025/0003885 A1* | 1/2025 | Kurani | G01N 21/272 |

FOREIGN PATENT DOCUMENTS

| | | | | |
|---|---|---|---|---|
| CN | 105658134 B | | 11/2019 | |
| CN | 111386107 A | * | 7/2020 | ........... A61K 31/195 |
| CN | 111529537 A | * | 8/2020 | ............. A61K 31/57 |
| CN | 113096772 A | * | 7/2021 | |
| EP | 1755743 B | | 4/2013 | |
| TW | 201817423 A | | 5/2018 | |
| TW | 201842316 A | | 12/2018 | |
| WO | WO-2006098767 A2 | * | 9/2006 | ............. A61K 31/19 |
| WO | WO-2010147913 A1 | * | 12/2010 | ........... A61B 5/0476 |
| WO | WO-2013085047 A1 | * | 6/2013 | ............. A23L 1/296 |
| WO | WO-2019013635 A1 | * | 1/2019 | ............. A23L 33/00 |
| WO | WO-2021062398 A1 | * | 4/2021 | ............. G16H 20/60 |

* cited by examiner

200

S201 preloading a plurality of electroencephalogram data of a responder group and a plurality of electroencephalogram data of a non-responder group, in which each electroencephalogram datum of the electroencephalogram data of the responder group and the electroencephalogram data of the non-responder group includes a plurality of electroencephalograms of a plurality of channels

S202 preprocessing the electroencephalograms of the channels to obtain a plurality of preprocessed electroencephalograms of the channels

S203 obtaining a connectivity matrix based on a phase synchronization between each two of the preprocessed electroencephalograms of the channels

S204 sampling and analyzing the connectivity matrix through different frequency bands and different proportion threshold values to obtain a plurality of network parameters

S205 establishing a predictive model based on a reduction rate of a predetermined event of the responder group, a reduction rate of the predetermined event of the non-responder group and the network parameters

Fig. 2

KETOGENIC DIETARY EVALUATION SYSTEM AND OPERATION METHOD THEREOF

BACKGROUND

Field of Invention

The present invention relates to systems and methods, and more particularly, ketogenic diet evaluation systems and operation methods thereof.

Description of Related Art

Epilepsy is a disease that occurs repeatedly. The so-called "epileptic seizure" refers to the abnormal discharge of brain cells that leads to sudden convulsions, changes in consciousness, abnormal sensations, and strange behaviors. If two or more drugs are used, and the maximum reasonable dose is reached, the epileptic seizure cannot be controlled, which is called "intractable epilepsy".

In medicine, the ketogenic diet is mainly used for intractable epilepsy that is difficult to control in children. However, not every child can effectively suppress intractable epilepsy after eating a ketogenic diet, and most children do not like the ketogenic diet.

SUMMARY

In one or more various aspects, the present disclosure is directed to ketogenic diet evaluation systems and operation methods thereof.

An embodiment of the present disclosure is related to a ketogenic diet evaluation system. The ketogenic diet evaluation system includes a storage device and a processor. The storage device is configured to store at least one instruction, a plurality of electroencephalogram data of a responder group and a plurality of electroencephalogram data of a non-responder group, in which each electroencephalogram datum of the electroencephalogram data of the responder group and the electroencephalogram data of the non-responder group includes a plurality of electroencephalograms of a plurality of channels. The processor coupled to the storage device, and the processor configured to access and execute the at least one instruction for: preprocessing the electroencephalograms of the channels to obtain a plurality of preprocessed electroencephalograms of the channels; obtaining a connectivity matrix based on a phase synchronization between each two of the preprocessed electroencephalograms of the channels; sampling and analyzing the connectivity matrix through different frequency bands and different proportion threshold values to obtain a plurality of network parameters; and establishing a predictive model based on a reduction rate of a predetermined event of the responder group, a reduction rate of the predetermined event of the non-responder group and the network parameters.

In one embodiment of the present disclosure, the processor accesses and executes the at least one instruction for: using a restricted cubic spline for establishing the predictive model based on the reduction rate of the predetermined event of the responder group, the reduction rate of the predetermined event of the non-responder group and the network parameters.

In one embodiment of the present disclosure, the processor accesses and executes the at least one instruction for: analyzing a plurality of new electroencephalograms of the channels based on the predictive model to determine whether the new electroencephalograms are inclined to the response group or the non-response group.

In one embodiment of the present disclosure, the ketogenic diet evaluation system further includes a communication device electrically connected to the processor, and the processor accesses and executes the at least one instruction for: sending an alert notification to a mobile application program of a mobile device through the communication device when the new electroencephalograms are inclined to the non-responsive group.

In one embodiment of the present disclosure, the ketogenic diet evaluation system further includes a communication device electrically connected to the processor, in which after a mobile device takes a photo of a food and transmits the photo of the food to the communication device through a mobile application program of the mobile device, the processor determines whether the food belongs to a ketogenic diet, and when the processor determines that the food does not belong to the ketogenic diet, the processor pushes a prohibition message to the mobile application program through the communication device.

Another embodiment of the present disclosure is related to an operation method of a ketogenic diet evaluation system. The operation method includes steps of: preloading a plurality of electroencephalogram data of a responder group and a plurality of electroencephalogram data of a non-responder group, in which each electroencephalogram datum of the electroencephalogram data of the responder group and the electroencephalogram data of the non-responder group comprises a plurality of electroencephalograms of a plurality of channels; preprocessing the electroencephalograms of the channels to obtain a plurality of preprocessed electroencephalograms of the channels; obtaining a connectivity matrix based on a phase synchronization between each two of the preprocessed electroencephalograms of the channels; sampling and analyzing the connectivity matrix through different frequency bands and different proportion threshold values to obtain a plurality of network parameters; and establishing a predictive model based on a reduction rate of a predetermined event of the responder group, a reduction rate of the predetermined event of the non-responder group and the network parameters.

In one embodiment of the present disclosure, the step of establishing a predictive model includes: using a restricted cubic spline for establishing the predictive model based on the reduction rate of the predetermined event of the responder group, the reduction rate of the predetermined event of the non-responder group and the network parameters.

In one embodiment of the present disclosure, the operation method further includes steps of: analyzing a plurality of new electroencephalograms of the channels based on the predictive model to determine whether the new electroencephalograms are inclined to the response group or the non-response group.

In one embodiment of the present disclosure, the operation method further includes steps of: sending an alert notification to a mobile application program of a mobile device when the new electroencephalograms are inclined to the non-responsive group.

In one embodiment of the present disclosure, the operation method further includes steps of: determining whether a food belongs to the ketogenic diet after receiving a photo of the food sent by a mobile device through a mobile application program; and pushing a prohibition message to the mobile application program when determining that the food does not belong to a ketogenic diet.

Technical advantages are generally achieved, by embodiments of the present disclosure. With the ketogenic diet evaluation system and its operation method of the present disclosure, the predictive model can be trained to calculate and analyze the electroencephalograms of epilepsy subjects who started to accept the ketogenic diet, so as to more accurately predict whether the ketogenic diet will be effective in reducing the seizure rate in the future, thereby avoiding different evaluators' different evaluation results on the brain waves.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows:

FIG. 2 is a flow chart of an operation method of the ketogenic diet evaluation system according to one embodiment of the present disclosure.

DETAILED DESCRIPTION

Figure 1:
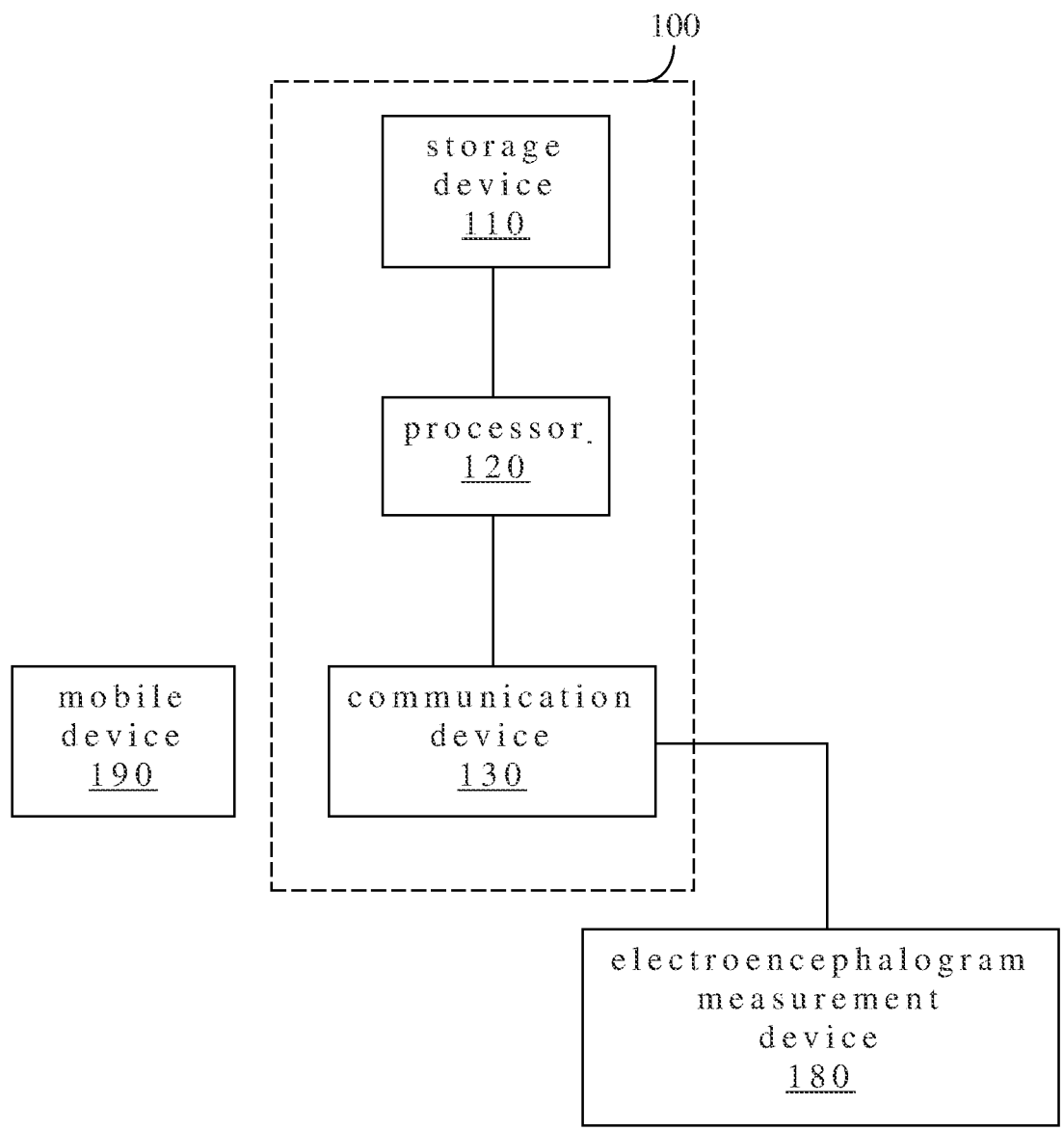
FIG. 1 is a block diagram of a ketogenic diet evaluation system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, in one aspect, the present disclosure is directed to a ketogenic diet evaluation system 100. The ketogenic diet evaluation system 100 may be easily integrated into a computer and may be applicable or readily adaptable to all technologies. Technical advantages are generally achieved by the ketogenic diet evaluation system 100 according to embodiments of the present disclosure. Herewith the ketogenic diet evaluation system 100 is described below with FIG. 1.

The subject disclosure provides the ketogenic diet evaluation system 100 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form to facilitate describing these aspects. The word "exemplary" is used herein to mean "serving as an example, instance, or illustration." Any embodiment described herein as "exemplary" is not necessarily to be construed as preferred or advantageous over other embodiments.

In practice, for example, the ketogenic diet evaluation system 100 can be a server, a computer host or other computer equipment. The server can be remotely managed in a manner that substantially provides accessibility, consistency, and efficiency. Remote management removes the need for input/output interfaces (e.g., a display screen, a mouse, a keyboard, and so on) in the servers. An administrator can manage a large data centers containing numerous rack servers using a variety of remote management tools, such as simple terminal connections, remote desktop applications, and software tools used to configure, monitor, and troubleshoot server hardware and software.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

In practice, in one embodiment of the present disclosure, the ketogenic diet evaluation system 100 can selectively establish a connection with the brain wave measurement device 180. It should be noted that, in the detailed description and the scope of the patent application, the description involving "connection" can generally means that a element indirectly communicates with another element through wired and/or wireless communication through other intervening elements, or a intervening is physically connected to another element without other intervening elements. For example, the ketogenic diet evaluation system 100 can indirectly communicate with the brain wave measurement device 180 via other components through wired and/or wireless communication, or the ketogenic diet evaluation system 100 can be physically connected to the network measurement device 180 without other intervening elements; those skilled in the art should adjust the connection flexibly depending on desired needs.

FIG. 1 is a block diagram of the ketogenic diet evaluation system 100 according to one embodiment of the present disclosure. As shown in FIG. 1, the ketogenic diet evaluation system 100 includes a storage device 110, a processor 120 and a communication device 130. For example, the storage device 110 can be a hard disk, a flash storage device or other storage media, the processor 120 can be a central processing unit, and the communication device 130 can be a wired and/or wireless network device.

In structure, the storage device 110 is electrically connected to the processor 120, and the processor 120 is electrically connected to the communication device 130. It should be noted that when an element is referred to as being "electrically connected" to another element, it can be directly connected or coupled to the other element or intervening elements may be present. For example, the storage device 110 may be a built-in storage device that is directly connected to the processor 120, or the storage device 110 may be an external storage device that is indirectly connected to the processor 120 through a network device.

In one embodiment of the present disclosure, the storage device 110 is configured to store at least one instruction, a plurality of electroencephalogram data of a responder group (e.g., a group of people whose seizure rate is effectively reduced after a ketogenic diet) and a plurality of electroencephalogram data of a non-responder group (e.g., a group of people whose seizure rate is not effectively reduced after the ketogenic diet), in which each electroencephalogram datum of the electroencephalogram data of the responder group and the electroencephalogram data of the non-responder group includes a plurality of electroencephalograms of a plurality of channels. The processor 120 is configured to access and execute the at least one instruction for: preprocessing the electroencephalograms of the channels to obtain a plurality of preprocessed electroencephalograms of the channels; obtaining a connectivity matrix based on a phase synchronization between each two of the preprocessed electroencephalograms of the channels; sampling and analyzing the connectivity matrix through different frequency bands (e.g., 8, α, β and other different frequency bands) and different proportion threshold values (e.g., 90%, 85%, . . . 10% connection strengths) to obtain a plurality of network parameters (e.g., average clustering coefficient, average efficiency, average betweenness centrality, and so on); and establishing a predictive model based on a reduction rate of a predetermined event (e.g., epileptic seizure) of the responder group, a reduction rate of the predetermined event of the non-responder group and the network parameters. In this way, the predictive model can be used to calculate and analyze the electroencephalograms of epilepsy subjects who started to accept the ketogenic diet, so as to more accurately predict whether the ketogenic diet will be effective in reducing the seizure rate in the future, thereby avoiding different evaluators' different evaluation results on the electroencephalogram.

Regarding the above preprocessing, in practice, for example, each electroencephalogram (EEG) channel was band-pass filtered using a finite impulse response filter in the 0.5-30 Hz frequency band. Data were re-referenced to the average of all scalp channels. Subsequently, the independent component analysis (ICA) decomposition was performed to remove eye movements, blinks, and other mechanical artifacts from EEGs. The EEGs were then partitioned into 29 epochs with duration of 4 s and an overlap of 2 s. The epochs were examined to guarantee that none of them involved bad channels and none of them contain head motion or muscle movement. In this way, the preprocessed electroencephalograms (EEGs) have removed the effects of eye movements, blinks, mechanical artifacts, head motion, muscle motion, and so on.

With regard to the way of establishing the predictive model, in one embodiment of the present disclosure, the processor 120 accesses and executes the at least one instruction for: using a restricted cubic spline for establishing the predictive model based on the reduction rate of the predetermined event of the responder group, the reduction rate of the predetermined event of the non-responder group and the network parameters. Since the network parameters are non-linear, the predictive model is established through the restricted cubic spline, which has better prediction accuracy.

Compared with the above-mentioned restricted cubic spline, in a control experiment, establishing a prediction model through a traditional multivariate regression model leads to a reduction in the accuracy of prediction.

In one embodiment of the present disclosure, the processor 120 accesses and executes the at least one instruction for: analyzing a plurality of new electroencephalograms of the channels (e.g., EEGs of epilepsy subjects who started to accept the ketogenic diet) based on the predictive model to determine whether the new electroencephalograms are inclined to the response group or the non-response group. In this way, the predictive model can be used to calculate and analyze the electroencephalograms of epilepsy subjects who started to accept the ketogenic diet, so as to more accurately predict whether the ketogenic diet will be effective in reducing the seizure rate in the future.

As above, in one embodiment of the present disclosure, the processor 120 accesses and executes the at least one instruction for: sending an alert notification to a mobile application program of a mobile device 190 through the communication device 130 when the new electroencephalograms are inclined to the non-responsive group. In this way, since it is predicted that the ketogenic diet may not be effective in reducing the seizure rate in the future, the doctor can evaluate whether to stop the ketogenic diet and switch to other treatments (e.g., epilepsy surgery, neuromodulation technology and so on) through on the alert notification the mobile application program (in a doctor mode) of the mobile device 190.

In practice, for example, besides the doctor mode mentioned above, the mobile application program also has a family mode.

In one embodiment of the present disclosure, after the mobile device 190 takes a photo of a food and transmits the photo of the food to the communication device 130 through the mobile application program (in the family mode) of the mobile device 190, the processor 120 determines whether the food belongs to a ketogenic diet, and when the processor 120 determines that the food (e.g., a candy) does not belong to the ketogenic diet, the processor 120 pushes a prohibition message to the mobile application program through the communication device 130, so that the mobile application program can render a small window reminding the wrong (NG) food.

In practice, for example, the storage device 110 can pre-establish a classification identification model of the ketogenic diet, so that the processor 120 can decide. For unknown foods, family members only need to upload photos to the ketogenic diet evaluation system 100 through the user interface of the mobile application program of the mobile device 190, and they can quickly get the judgment result.

Regarding the conventional ketogenic diet programs on the market, they are all used for weight loss/body shaping, not for the treatment of epilepsy. The function of the mobile application (APP) developed in the present disclosure is to combine epilepsy-related records and data, so that patients can easily record epileptic seizures and diet records, which can be used as the basis for disease treatment by clinical doctors, nutritionists and personal managers. The mobile application program of the present disclosure supports detailed diet records (including photo taking function), small windows to remind NG foods, side effect records, ketogenic diet recipes and original story picture books (e.g., Lightning Rabbit story picture book), these functions make epilepsy patients and their caregivers better understand the relevant information of the ketogenic diet, so that they can facilitate diet records and meal preparation, remind themselves whether they have eaten NG food by mistake, and observe whether there are side effects after using the ketogenic diet.

The inspection/examination data at the hospital end are uploaded to the cloud database of the registered ID of the epilepsy patient, and the data analysis server (e.g., the ketogenic diet evaluation system 100) downloads and analyzes the data, and then uploads the analysis results back to the cloud database, so that the mobile application (APP) mentioned above can allow the epilepsy patients and their caregivers to know the test/examination and analysis results. The present disclosure uses electroencephalograms data as the basis for analysis, can also add more useful biomarkers to more accurately predict the degree of efficacy of the ketogenic diet for the epilepsy patients, and further diagnose which epilepsy patients are suitable for ketogenic diet treatment.

For a more complete understanding of an operation method of the ketogenic diet evaluation system 100, referring FIGS. 1-2, FIG. 2 is a flow chart of the operation method 200 of the ketogenic diet evaluation system 100 according to one embodiment of the present disclosure. As shown in FIG. 2, the operation method 200 includes operations S201-S205. However, as could be appreciated by persons having ordinary skill in the art, for the steps described in the present embodiment, the sequence in which these steps are performed, unless explicitly stated otherwise, can be altered depending on actual needs; in certain cases, all or some of these steps can be performed concurrently.

The operation method 200 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

In operation S201, a plurality of electroencephalogram data of a responder group and a plurality of electroencephalogram data of a non-responder group are preloaded, in which each electroencephalogram datum of the electroencephalogram data of the responder group and the electroencephalogram data of the non-responder group comprises a plurality of electroencephalograms of a plurality of channels. In operation S202, the electroencephalograms of the channels are preprocessed to obtain a plurality of preprocessed electroencephalograms of the channels. In operation S203, a connectivity matrix based on a phase synchronization between each two of the preprocessed electroencephalograms of the channels is obtained. In operation S204, the connectivity matrix is sampled and analyzed through different frequency bands and different proportion threshold values to obtain a plurality of network parameters. In operation S205, a predictive model based on a reduction rate of a predetermined event of the responder group, a reduction rate of the predetermined event of the non-responder group and the network parameters are established.

In one embodiment of the present disclosure, the operation S205 includes: using a restricted cubic spline for establishing the predictive model based on the reduction rate of the predetermined event of the responder group, the reduction rate of the predetermined event of the non-responder group and the network parameters.

In one embodiment of the present disclosure, the operation method 200 further includes steps of: analyzing a plurality of new electroencephalograms of the channels based on the predictive model to determine whether the new electroencephalograms are inclined to the response group or the non-response group.

In one embodiment of the present disclosure, the operation method 200 further includes steps of: sending an alert notification to a mobile application program of a mobile device when the new electroencephalograms are inclined to the non-responsive group.

In one embodiment of the present disclosure, the operation method 200 further includes steps of: determining whether a food belongs to the ketogenic diet after receiving a photo of the food sent by a mobile device through a mobile application program; and pushing a prohibition message to the mobile application program when determining that the food does not belong to a ketogenic diet.

Technical advantages are generally achieved, by embodiments of the present disclosure. With the ketogenic diet evaluation system 100 and its operation method 200 of the present disclosure, the predictive model can be trained to calculate and analyze the electroencephalograms of epilepsy subjects who started to accept the ketogenic diet, so as to more accurately predict whether the ketogenic diet will be effective in reducing the seizure rate in the future, thereby avoiding different evaluators' different evaluation results on the electroencephalograms.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A ketogenic diet evaluation system, comprising:
   a storage device configured to store at least one instruction, a plurality of electroencephalogram data of a responder group and a plurality of electroencephalogram data of a non-responder group, wherein each electroencephalogram datum of the electroencephalogram data of the responder group and the electroencephalogram data of the non-responder group comprises a plurality of electroencephalograms of a plurality of channels; and
   a processor coupled to the storage device, and the processor configured to access and execute the at least one instruction for:
      preprocessing the electroencephalograms of the channels to obtain a plurality of preprocessed electroencephalograms of the channels;
      obtaining a connectivity matrix based on a phase synchronization between each two of the preprocessed electroencephalograms of the channels;
      sampling and analyzing the connectivity matrix through different frequency bands and different proportion threshold values to obtain a plurality of network parameters; and
      establishing a predictive model based on a reduction rate of a predetermined event of the responder group, a reduction rate of the predetermined event of the non-responder group and the network parameters;
      analyzing a plurality of new electroencephalograms of the channels based on the predictive model to determine whether the new electro electroencephalograms is are inclined to the response group or the non-response group and to provide a determination result accordingly;
      determining whether a seizure rate is reduced after ketogenic diet.

2. The ketogenic diet evaluation system of claim 1, wherein the processor accesses and executes the at least one instruction for:
   using a restricted cubic spline for establishing the predictive model based on the reduction rate of the predetermined event of the responder group, the reduction rate of the predetermined event of the non-responder group and the network parameters.

3. The ketogenic diet evaluation system of claim 1, further comprising:
   a communication device electrically connected to the processor, and the processor accesses and executes the at least one instruction for:
   sending an alert notification to a mobile application program of a mobile device through the communication device when the new electroencephalograms are inclined to the non-responsive group.

4. The ketogenic diet evaluation system of claim 1, further comprising:
   a communication device electrically connected to the processor, wherein after a mobile device takes a photo of a food and transmits the photo of the food to the communication device through a mobile application program of the mobile device, the processor determines whether the food belongs to the ketogenic diet, and when the processor determines that the food does not belong to the ketogenic diet, the processor pushes a prohibition message to the mobile application program through the communication device.

5. An operation method of a ketogenic diet evaluation system, and the operation method comprising steps of:
preloading a plurality of electroencephalogram data of a responder group and a plurality of electroencephalogram data of a non-responder group, wherein each electroencephalogram datum of the electroencephalogram data of the responder group and the electroencephalogram data of the non-responder group comprises a plurality of electroencephalograms of a plurality of channels;
preprocessing the electroencephalograms of the channels to obtain a plurality of preprocessed electroencephalograms of the channels;
obtaining a connectivity matrix based on a phase synchronization between each two of the preprocessed electroencephalograms of the channels;
sampling and analyzing the connectivity matrix through different frequency bands and different proportion threshold values to obtain a plurality of network parameters; and
establishing a predictive model based on a reduction rate of a predetermined event of the responder group, a reduction rate of the predetermined event of the non-responder group and the network parameters;
analyzing a plurality of new electroencephalograms of the channels based on the predictive model to determine whether the new electroencephalograms are inclined to the response group or the non-response group and to provide a determination result accordingly; and
determining whether a seizure rate is reduced after a ketogenic diet.

6. The operation method of claim 5, wherein the step of establishing a predictive model comprises:
using a restricted cubic spline for establishing the predictive model based on the reduction rate of the predetermined event of the responder group, the reduction rate of the predetermined event of the non-responder group and the network parameters.

7. The operation method of claim 6, further comprising:
sending an alert notification to a mobile application program of a mobile device when the new electroencephalograms are inclined to the non-responsive group.

8. The operation method of claim 5, further comprising:
determining whether a food belongs to the ketogenic diet after receiving a photo of the food sent by a mobile device through a mobile application program; and
pushing a prohibition message to the mobile application program when determining that the food does not belong to the ketogenic diet.

* * * * *